United States Patent [19]

Day

[11] 4,126,357
[45] Nov. 21, 1978

[54] DEMOUNTABLE TILTING CONTAINER ASSEMBLIES FOR LIGHT VANS AND TRUCKS

[75] Inventor: Edward J. Day, Ilford, England

[73] Assignee: Gowing Engineering Limited, London, England

[21] Appl. No.: 857,443

[22] Filed: Dec. 5, 1977

[30] Foreign Application Priority Data

Dec. 16, 1976 [GB] United Kingdom ............... 52583/76

[51] Int. Cl.² ............................................. B60P 1/16
[52] U.S. Cl. .................................. 298/1 A; 298/22 R
[58] Field of Search ............ 298/1 A, 22 R, 18, 17 R

[56] References Cited

U.S. PATENT DOCUMENTS

| 3,740,097 | 6/1973 | Parker | 298/1 A |
| 3,871,706 | 3/1975 | Odom | 298/1 A |

Primary Examiner—Albert J. Makay
Assistant Examiner—George F. Abraham
Attorney, Agent, or Firm—Shoemaker and Mattare, Ltd.

[57] ABSTRACT

The invention provides a unitary tilting container assembly of the portable type adapted to be mounted and demounted on a truck, which includes, in combination, a T-shaped bracing structure adapted to be bolted to the truck, there being hinged, at a first pivot axis, to the bar of the T a box-like load bearing tilting container. There is a hydraulic ram pivotally connected on the one hand, at a second pivot axis, to the end of the leg of the T-shaped bracing structure and, at a third pivot axis, to a trunnion carried on the underside of the container. The ram is extensible and pivotal about the second pivot axis from a closed position in which the floor of the container is alongside and substantially parallel to the leg of the T-shaped bracing structure to an open position of the ram in which the floor of the container is inclined to the leg of the T-shaped bracing structure by an angle of at least 25°. All said first, second and third pivot axes are substantially parallel to one another. In the closed position of the ram, the angle between, on the one hand, a line drawn between said first and second pivot axes and, on the other hand, a line drawn between said second and third pivot axes, is more than 5° and less than 15°.

3 Claims, 7 Drawing Figures

DEMOUNTABLE TILTING CONTAINER ASSEMBLIES FOR LIGHT VANS AND TRUCKS

This invention relates to a tilting container for attachment to a haulage van or truck, and one object of the present invention is to provide a unitary tipping assembly consisting of a box-like container and below its floor a ram, which unitary assembly can be easily fitted to an existing vehicle, either to the chassis or to an existing load-carrying platform thereof.

It is current practice for some vehicle manufacturers to supply their small trucks or vans with an integral load-carrying platform, usually in the form of a stressed steel sheet. Sometimes vehicle manufacturers initially provide their vehicles with a box-like load-carrying container which incorporates such a platform with there being upstanding from the margins of the platform, panels which may be tiltable or even removable and which constitute the sides and tail of the load-carrying container.

It has been proposed to provide a demountable bed for trucks having a load support frame which can be slid on to an existing floor of the truck, there being a tilt container pivotally mounted on the support frame and a hydraulic lift assembly disposed beneath the floor of the tilt container and operative to effect tilting of the container relative to the support frame. Examples of such prior proposals can be found in U.S. Pat. Specifications Nos. 2,358,224, 3,411,825 and 3,871,706. However, all these prior proposals result in devices which are heavy and difficult to adapt for use in small trucks. Moreover, these prior proposals have necessitated linkages of some complexity between the ram and the tilting container to facilitate lifting of the container.

The adaptation of small vehicles so that they are provided with a tilting container of the kind in which the front of the container can be elevated at will so that the contents can be discharged to the rear presents some problems. For example, it may be necessary to remove existing body-work which upstands from the margins of the load-carrying platform, or it may be necessary to provide, superposed above the load-carrying platform, a subframe structure which is strong enough to accommodate the loads which are exerted when a hydraulic ram is employed to elevate a tilting container, with such container being pivoted at the rear of the vehicle.

One particular object of the present invention is to provide a unitary tilting container assembly which is so easily fitted that in many cases a user, other than a specialist in coach-work, may readily mount it on or demount it from the body or chassis of a vehicle in his keeping.

A further object of the invention is to provide a unitary tilting container assembly which can be fitted in or on an existing load-carrying body or platform with the minimum of alteration to the platform being required.

According to the present invention there is provided a unitary tilting container assembly of the portable type adapted to be mounted and demounted on a truck, which includes, in combination, a T-shaped bracing structure adapted to be bolted to the truck, there being hinged, at a first pivot axis, to the bar of the T a box-like load bearing tilting container, and there being a hydraulic ram pivotally connected on the one hand, at a second pivot axis, to the end of the leg of the T-shaped bracing structure and, at a third pivot axis, to a trunnion carried on the underside of the container, said ram being extensible and pivotal about the second pivot axis from a closed position in which the floor of the container is alongside and substantially parallel to the leg of the T-shaped bracing structure to an open position of the ram in which the floor of the container is inclined to the leg of the T-shaped bracing structure by an angle of at least 25°, all said first, second and third pivot axes being substantially parallel to one another, and wherein, in the closed position of said ram, the angle between, on the one hand, a line drawn between said first and second pivot axes and, on the other hand, a line drawn between said second and third pivot axes, is more than 5° and less than 15°.

The box-like container has its under-floor suitably strengthened to accommodate the large forces which will be exerted on it by the ram during extension of the latter, and preferably the underside of the floor is recessed longitudinally so that the ram is located in this recess when the ram is fully retracted.

The underside of the container floor may also be shaped to accommodate the wheel arches which protrude into the load-carrying space of some vans and light trucks.

In this way there is provided a self-contained tilting container which can, if desired, be fitted, so to speak, on and within a box-like body already existing on the vehicle. With such an arrangement the total volume of load-carrying space available on the vehicle will be slightly reduced. However, this reduction will be outweighed by the facility for tipping which is provided.

The function of the T-shaped bracing structure provided in the tilting container assembly according to the invention is, on the one hand, that it should be easily bolted to a generally horizontal platform or other body structure at the rear of the vehicle, and that, in the case where the tilting container assembly is to be fitted on an existing stressed panel, this T-shaped bracing structure provides a means whereby loads generated when the container is tilted are distributed widely over the stressed pannel. On the other hand, fitment of the tilting container assembly according to the invention to an existing vehicle body simply necessitates the drilling of a number of holes to receive bolts for securing the T-shaped bracing structure to existing body components.

In order to operate the ram, that is to extend or retract the ram, there is provided a pump which may be either manual or electric motor driven, and which may be fitted either within the cab of the vehicle or attached to a rear panel of the cab.

The load-carrying container forming part of the assembly according to the invention may have in addition to a pivoted tail-gate, side walls which are pivoted either at their upper or at their lower regions.

Some examples of tilting container assemblies according to the invention are shown in the accompanying drawings in which.

Figure 1:
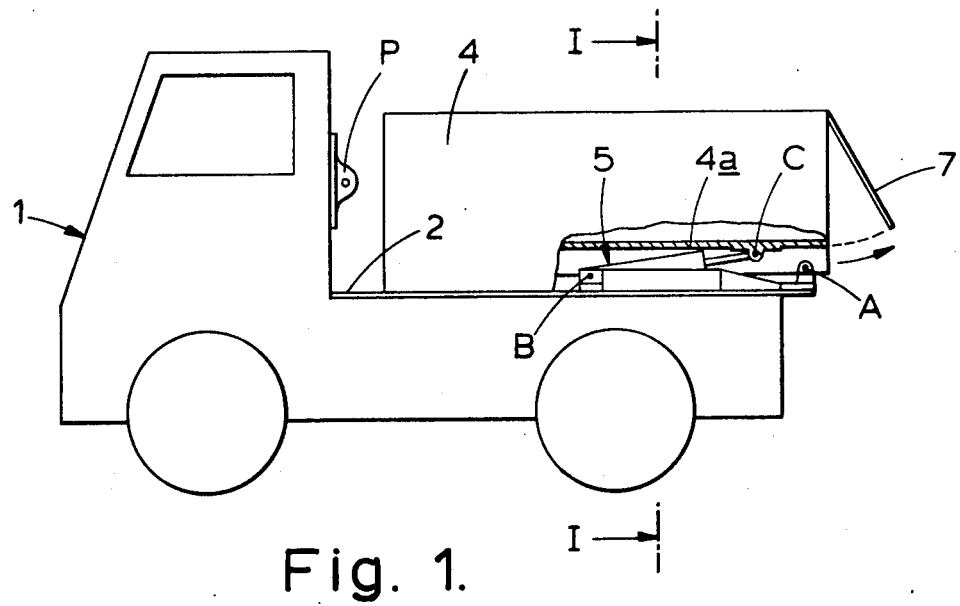
FIG. 1 is a side view of a small van having at its rear a panel constituting a load-carrying platform on which is shown fitted a unitary tilting container assembly according to the invention.
Figure 3:
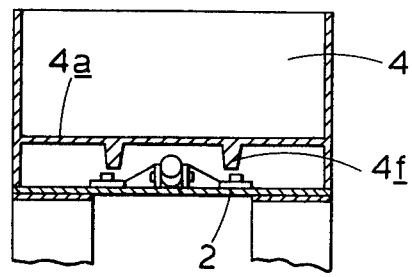
FIG. 3 is a cross-sectional view taken on the line I—I of FIG. 1.
Figure 4A:
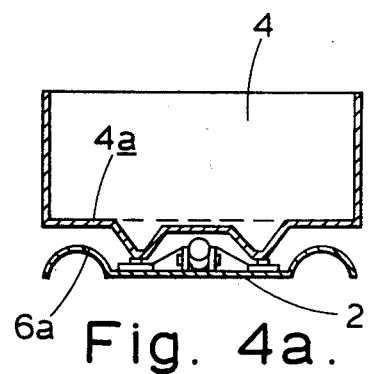
Figure 4B:
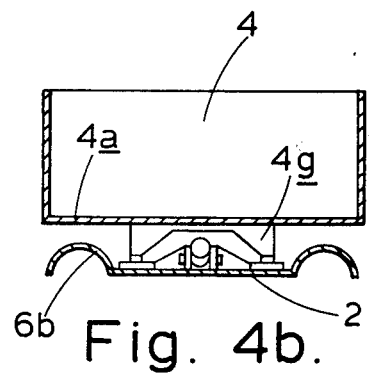
Figure 4C:
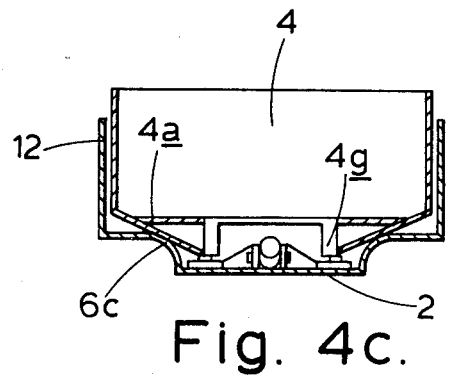
Figure 5:
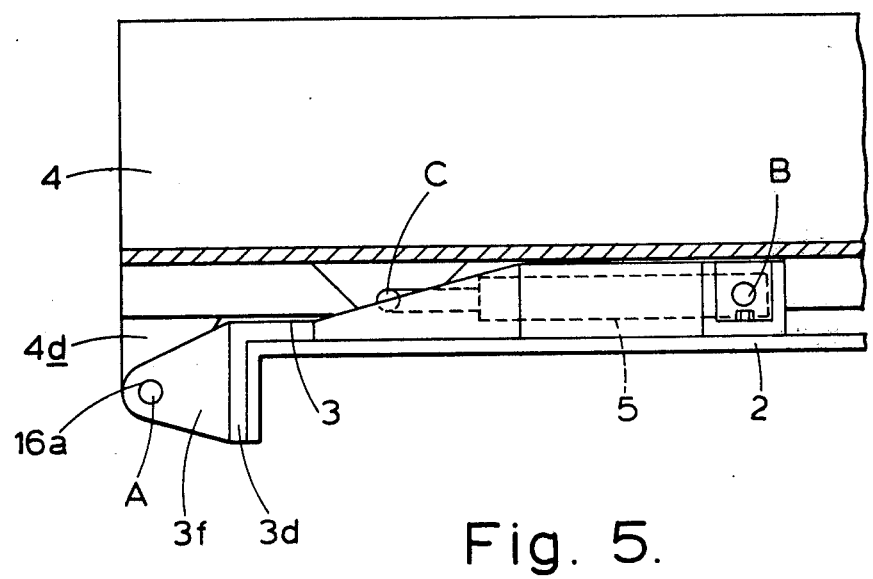

FIGS. 4a, 4b and 4c are cross-sectional views generally similar to that shown in FIG. 3 but showing different examples of a box-like tilting container which may be incorporated in the invention and how the shape of such container may be adapted to suit the shape of an existing platform or body on a small commercial vehicle; and FIG. 5 is a side view, partly in cross section, of part of a tilting container assembly and constituting an arrangement which is alternative to that shown in FIG. 1.

Figure 2:
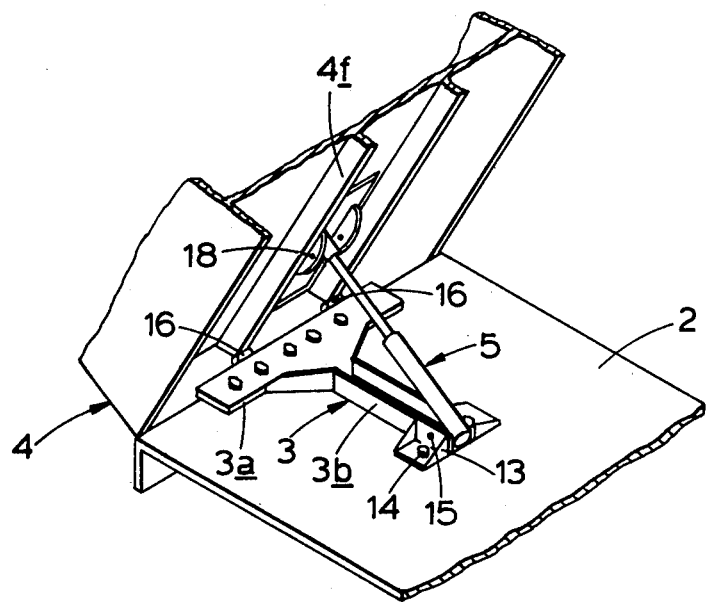
FIG. 2 is a elevational view showing important parts of the tilting container assembly shown in FIG. 1.

Referring now to FIGS. 1 to 3 of the drawings, the reference numeral 1 generally represents a light truck having at its rear a generally horizontal load-carrying platform 2. In the current state of the art the load-carrying platform 2 is often constituted by a generally horizontal thin steel panel which is corrugated or otherwise shaped so that it is capable of supporting load. However, if the load is not widely dispersed the thin panel is liable to suffer local deformation.

As shown in FIG. 4a, the platform 2 constituted by the thin steel panel may be shaped to incorporate wheel arches 6a or 6b, as shown in FIG. 4b.

Moreover, as shown in FIG. 4c, there may be upstanding from the sides of the platform 2, which incorporates wheel arches 6c, vertical panels 12. In the case of the arrangement shown in FIG. 4c, if a tail-gate is provided, this is usually easily removable.

Referring again to FIGS. 1 to 3, the invention provides a unitary tilting container assembly of the portable type which is adapted to be mounted and demounted on the platform 2. This assembly comprises firstly a T-shaped bracing structure generally designated 3, the bar of the T being indicated at 3a and the leg of the T being indicated at 3b. The T-shaped bracing structure is adapted to be bolted direct to the platform 2 so that its bar 3a is at the rear of the platform 2. Suitably the leg 3b of the T-shaped bracing structure has bracket means 13 through which pass bolts 14 for engagement with the platform 2. These bracket means 13 also constitute strengthening means for a pivot pin 15 by means of which the piston of a hydraulic ram generally designated 5 can be pivotally connected to the leg 3b of the T-shaped bracing structure.

Provided on the bar 3a of the T-shaped bracing structure are hinges, indicated at 16 in FIG. 2, for connecting to the structure 3 a load bearing box-like container, generally designated 4. The hinges 16 enable the container 4 to be tilted about an axis generally designated A, and defined by the hinges 16.

Carried on the underside of the floor 4a of the container 4 is a trunnion, indicated at 18 in FIG. 2. To this trunnion is connected the piston of the hydraulic ram 5.

The pivotal axis defined by the pivot pin 15 is indicated at B in FIG. 1 and the pivot axis defined by the trunnion 18 is indicated at C in FIG. 1.

The ram 5 is extensible and pivotal from and about the second pivot axis B from a closed position, as shown in FIG. 1, in which the floor of the container is alongside and substantially parallel to the leg 3b of the T-shaped bracing structure 3 to an open position of the ram, in which the floor of the container is as shown in FIG. 2 angled to the leg 3b of the T-shaped bracing structure by an angle of at least 25°.

The pivot axes A, B and C are parallel to one another and in the closed position of the ram, the angle (measured vertically) between, on the one hand, a line drawn between the first and second pivot axes A and B respectively, and, on the other hand, a line drawn between the second and third pivot axes B and C respectively, is more than 5° and less than 15°. This arrangement prevents unnecessarily high loading being exerted upon the hinge 16 when the ram begins to extend to effect lifting and tilting of the container.

As shown in FIG. 1, in the closed position the ram is not quite parallel to the leg 3b of the T-shaped bracing structure. This may be acceptable if there is sufficient clearance between the floor 4a of the container and the platform 2. However, with rams of sufficiently large diameter it may be necessary for the ram in its closed position to lie substantially parallel to the platform 2 and FIG. 5 shows how this can be achieved by lowering the location of the pivot axis A.

In the embodiment shown in FIG. 5, the container 4 is formed with downwardly extending lugs 4d while the T-shaped bracing structure 3 has a downwardly extending lip 3d which mounts lugs 3f. These lugs 3f mount hinge pin means 16a, defining the axis A, to which are also connected the lugs 14 depending from the container 4.

The box-like container 4 has its under-floor suitably strengthened, for example by the longitudinal beams indicated at 4f in FIG. 2. This reinforcement will accommodate the large forces which will be exerted on the floor 4a of the container 4 by the ram 5 during extension. Alternatively the floor 4a may be corrugated as shown in FIG. 4a.

As shown in FIGS. 4b and 4c, a separate bracket member 4g constituting a reinforcement may be provided on the underside of the floor 4a of the container 4.

The reinforcing means on the underside of the container 4 may consist of or include beams arranged in an 'X' configuration but preferably in all cases, these reinforcing means will constitute or define a recess for accommodation of the ram within this recess when the ram is fully retracted. Where the reinforcing means includes beams arranged in an 'X' configuration, the central intersection of the beams may suitably form a strong point for the ram pivot at axis C.

As shown in FIG. 4a, the underside of the container floor itself may be shaped so as to accommodate the wheel arches which protrude into the load-carrying space on some vans and light trucks.

The T-shaped bracing structure 3 not only provides a means for accommodating the large forces which are generated when the ram 5 is extending, but this structure 3 also provides a means whereby the unitary tilting container assembly can be quickly and easily attached to or detached from an existing load-carrying platform of a light truck. Furthermore this bracing structure 3 provides a means whereby loads derived from cargo carried within container 4 are fed into the platform 2, which may be of thin sheet steel panel, over a sufficiently wide region of the platform 2, so that local deformation of the platform 2 is reduced to a minimum.

In order to operate the ram 5 there is provided a pump, for example as shown at P in FIG. 1, which may be either manual or electric motor driven. This pump will be connected by a pipeline (not shown) to the ram, and valve means will be provided which may be operated either to allow fluid to pass from the pump to the ram or alternatively from the ram to a fluid reservoir so that the ram may be lowered.

The load carrying container 4 may be a pivot tail-gate 7 and the side walls of the container 4 may also be pivoted either at their upper or at their lower regions.

I claim:

1. A unitary tilting container assembly of the portable type adapted to be mounted and demounted on a truck, which includes, in combination, a T-shaped bracing structure adapted to be bolted to the truck, there being hinged, at a first pivot axis, to the bar of the T a box-like load bearing tilting container, and there being a hydraulic ram pivotally connected on the one hand, at a second pivot axis, to the end of the leg of the T-shaped bracing structure and, at a third pivot axis, to a trunnion carried on the underside of the container, said ram being extensible and pivotal about the second pivot axis from a closed position in which the floor of the container is alongside and substantially parallel to the leg of the T-shaped bracing structure to an open position of the ram in which the floor of the container is inclined to the leg of the T-shaped bracing structure by an angle of at least 25°, all said first, second and third pivot axes being substantially parallel to one another, and wherein, in the closed position of said ram, the angle between, on the one hand, a line drawn between said first and second pivot axes and, on the other hand, a line drawn between said second and third pivot axes, is more than 5° and less than 15°.

2. A tilting assembly as defined in claim 1, wherein the container is a box-like load bearing container and has the underside of its floor recessed longitudinally so that the ram is located in the recess, the underside of the floor being strengthened to accommodate the large forces which will be exerted on it by the ram.

3. A tilting assembly as defined in claim 2, wherein the box-like load bearing container has its floor shaped to accommodate the wheel arches which protrude into the load-carrying space.